(12) United States Patent
Mahapatra et al.

(10) Patent No.: US 12,443,655 B2
(45) Date of Patent: *Oct. 14, 2025

(54) SYSTEMS AND METHODS FOR EXTRACTING AND COMBINING XML FILES OF AN XFA DOCUMENT

(71) Applicant: Essenvia, Inc., Woodland Hills, CA (US)

(72) Inventors: Soumya Mahapatra, Woodland Hills, CA (US); Basant Sahoo, Karntaka (IN); Sandeep Patel, Karntaka (IN)

(73) Assignee: Essenvia, Inc., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,794

(22) Filed: Mar. 4, 2024

(65) Prior Publication Data
US 2025/0094492 A1      Mar. 20, 2025

Related U.S. Application Data

(63) Continuation of application No. 18/500,610, filed on Nov. 2, 2023, now Pat. No. 11,921,783.

(30) Foreign Application Priority Data

Sep. 20, 2023  (IN) .............. 202311063141

(51) Int. Cl.
*G06F 16/84*   (2019.01)
(52) U.S. Cl.
CPC .................... *G06F 16/84* (2019.01)

(58) Field of Classification Search
CPC ..................................................... G06F 16/84
See application file for complete search history.

(56) References Cited

U.S. PATENT DOCUMENTS

| 7,296,017 B2 | 11/2007 | Larcheveque et al. |
| 2014/0095968 A1 | 4/2014 | Harrop |
| 2018/0101525 A1 | 4/2018 | Hirata |

(Continued)

OTHER PUBLICATIONS

Adobe, XML Forms Architecture (XFA) Specification, Version 3.3 (Year: 2012).

(Continued)

*Primary Examiner* — William Spieler
(74) *Attorney, Agent, or Firm* — Womble Bond Dickinson (US) LLP

(57) ABSTRACT

Described herein are systems and methods for extracting and combining XML files of an XFA document. The systems include processors and memory for efficient processing and data storage. The systems can identify XFA documents and generate XML files by parsing the XFA documents. The systems can identify XML nodes within XML files, with each node corresponding to a particular node type, and generate web forms including web nodes, with each web node mapped to a corresponding XML node. The systems can receive input corresponding to the respective node type and store an association between the input received for the web node and the node type and an identifier of an XML node to which the web node is mapped. The systems can update the XML files using the association and generate the populated XFA document by combining the updated XML files according to the schema of the XFA document.

20 Claims, 9 Drawing Sheets

(56) References Cited

U.S. PATENT DOCUMENTS

2021/0004431 A1   1/2021   Li et al.

OTHER PUBLICATIONS

Laine, M., "XFormsDB-An XForms-Based Framework for Simplifying Web Application Development," (2010) Master's Thesis, Dept. Media Technology, Aalto University School of Science and Technology.
Meena, K., "Redesign of XForms XFDL and Enriching with Features from XFA," (2007) Masters Dissertation, Delhi College of Engineering.
Notice of Allowance on U.S. Appl. No. 18/500,610 Dtd Jan. 11, 2024.

Description

Please provide a device description Summary below, and ensure it includes an explanation of how the device functions, the scientific concepts that form the basis for the device, and the significant physical performance characteristics of the device, such as device design material used, and physical properties.

If you choose to use the 510(k) summary produced for you at the end of this template (in the Administrative Documentation page), you must provide this device description information in the textbox below, in accordance with 21 CFR 807(a)(4). The contents of the 510(k) Summary will be made publicly available on the FDA website if your device is cleared.

ONLY ENTER NONCONFIDENTIAL INFORMATION IN THE DEVICE DESCRIPTION SUMMARY TEXTBOX BELOW. CONFIDENTIAL INFORMATION CAN BE INCLUDED IN THE ATTACHMENT(S).

dddd

| Add Attachment | Comprehensive Device Description and Principles of Operation Documentation |
| Add Attachment | Device Pictures Illustrations, schematics, and/or Diagrams. Attach a justification if the device does not have a physical form. |
| Add Attachment | Description of Device Packaging |

System/Kit Components and Accessories

Is the device intended to be marketed with multiple system/kit components or accessories? Yes

Under section 513(f)(6), are you requesting risk-based classification of an accessory that is not explicitly identified in a classification regulation, or has not been included in a cleared 510(k), approved PMA, or granted De Novo request?

*General Device Characteristics*

- Is the device life-sustaining or life-supporting? No
- Are there any direct or indirect tissue contacting components? Yes
- Is the device or a component an implant? No
- Does the device use software/firmware? Yes
- Is the device, or does it contain, digital health technology? No
- Please check the attributes that are applicable to your device.
  - ☒ Cloud Communication
  - ☐ Network connection (active or not)
  - ☒ Wireless communication in any form
  - ☒ USB/serial ports/removable media
  - ☐ Software upgrades (this includes patches)
  - ☐ None of the above
- Is the device or a component packaged as sterile?
- The device/system uses or is... (choose all that apply)
  - ☒ a single use device(s), non-sterile or packaged as sterile
  - ☐ a single use device(s), terminal/end user sterilized
  - ☒ a reusable single patient use device(s)
  - ☐ a reusable multi-patient use device(s)
- The environment of use of the device/system includes... (choose all that apply)
  - ☐ Professional Healthcare Facility
  - ☐ Home Environment
  - ☐ Magnetic Resonance (MR) Environment
  - ☐ Transport (Ambulatory) Environment
  - ☐ Other Environment
- Is the device a combination product or does a Request For Designation (RFD) / pre-RFD exist for the product? Combination Product with RFD/pre-RFD
- Are the product and the indications for use the same as those identified in the RFD or pre-RFD submission?

Bookmarks:
- General Introduction
- Application/Submission Type
- Cover Letter/Letters of Reference
- Administrative Information
  - Application Forms
  - Applicant Information
  - Correspondent/consultant information
  - Pre-Submission
  - Correspondence and previous Regulator Interaction
  - Standards
- Device Description
  - Devices
  - General Considerations
  - General Characteristics
  - Description
  - Components and Accessories
  - Guidance Adherence
- Indications for Use
- Classification
- Marketing History
- Predicates and Substantial Equivalence
  - Predicate and Reference Devices
  - SE Comparison
- Benefits, Risks, and Mitigation Measures
- Design Control Activities
- Verification and/or Validation

SYSTEMS AND METHODS FOR EXTRACTING AND COMBINING XML FILES OF AN XFA DOCUMENT

CROSS-REFERENCE TO RELATED APPLICATION

This application claims the benefit of priority to U.S. patent application Ser. No. 18/500,610, filed Nov. 2, 2023, which claims the benefit of priority to Indian Provisional Application No. 202311063141, filed Sep. 20, 2023, the entirety of each of which is incorporated by reference herein.

BACKGROUND

Extensible Markup Language (XML) Forms Architecture (XFA) documents carry several benefits for users and creators of dynamic forms. First, they allow for the creation of more interactive and dynamic documents compared to traditional PDFs, leveraging the XML structure to offer functionalities such as conditional formatting, calculations, and validations at a finer granularity. This results in a more tailored and potentially intuitive user experience. Second, being structured in XML means that data from XFA forms can be more easily integrated with enterprise systems and databases, facilitating smoother data exchanges and automated workflows. Furthermore, XFA documents are ideal for complex forms and applications where there is a need for a structured, secure, and standardized data format. Finally, with its scriptable support, XFA facilitates creating more intelligent documents, which can potentially reduce errors and improve efficiency in data collection processes, thereby saving time and reducing costs for organizations.

SUMMARY

It is advantageous for a system to facilitate the extraction and combination of XML forms of XFA documents into interactive web forms that can be populated and converted back into the original XFA documents as populated while preserving the inherent properties of the original XFA documents. For example, such a system can include one or more processors coupled to memory. The one or more processors may identify an XFA document. Upon identifying the XFA document, the one or more processors may generate a plurality of XML files from the XFA document by parsing the XFA document using a parsing library. The one or more processors may identify, for each XML file of at least a subset of the plurality of XML files, a plurality of XML nodes within the XML file. Each XML node of the plurality of XML nodes may correspond to a particular node type in the XML file derived from a corresponding XFA node. The one or more processors may generate, for the subset of the plurality of XML files, a corresponding plurality of web forms including a plurality of web nodes. Each web node may be mapped to a corresponding XML node and have a node type matching a node type of the corresponding XML node. The one or more processors may receive, responsive to providing the plurality of web forms via a user interface, for one or more web nodes of the plurality of web forms, input corresponding to the respective node type of the one or more web nodes. The one or more processors may store, in a data structure, for the one or more web nodes of the plurality of web nodes, an association between the input received for the web node and the node type and an identifier of an XML node to which the web node is mapped. In response to receiving a request to generate a populated XFA document, the one or more processors may update the subset of the plurality of the XML files using, for each web node, the respective association between the input received for the web node and the corresponding identifier of the XML node of the subset of the plurality of XML files. The one or more processors may generate, responsive to updating the subset of the plurality of XML files, the populated XFA document by combining the updated XML files according to the schema of the XFA document.

In some implementations, the node type may include at least one of the following: a form, an element of the form, an attribute, or a data value of an XML node. In some implementations, the one or more processors may receive the input by receiving i) a selection of a radio button, ii) a selection of a drop-down menu, iii) a textual input in a text field, or iv) an identification of a file to be submitted as an attachment. In some implementations, the one or more processors may assign, to at least one web node of the plurality of web nodes, an event initializer that may initiate a process responsive to an interaction with the at least one web node. The process may further include modifying one or more second web nodes. In some implementations, the plurality of web forms may be a plurality of HTML forms.

In some implementations, the one or more processors may identify the schema from the XFA document. The schema may indicate the locations of the XML files on the XFA document. In some implementations, the one or more processors may store the populated XFA document in memory with an XFA document identifier. The one or more processors may receive, from a computing device, a request comprising the XFA document identifier. Further, the one or more processors may, responsive to the request, retrieve the XFA document based on the XFA document identifier and transmit the XFA document to the computing device.

In some implementations, to generate a plurality of XML files from the XFA document, the one or more processors may segment the XFA document into a plurality of XML segments according to a set of criteria and generate a respective XML file for each of the plurality of XML segments. In some implementations, the one or more processors may convert the XFA document into a flat file format and transmit the XFA document in the flat file to a computing device.

In some implementations, the one or more processors may generate the user interface to include the plurality of web forms and transmit the user interface to a plurality of computing devices. In some implementations, the one or more processors may receive input from the plurality of computing devices at one or more of the plurality of web forms. In some implementations, the input may include a plurality of values or selections. In some implementations, the one or more processors may receive a respective portion of the input from each of the plurality of computing devices. In some implementations, the one or more processors may provide access to a different set of the plurality of web forms to each of the plurality of computing devices. In some implementations, the one or more processors may restrict at least one of the plurality of computing devices from providing an input to a defined set of the plurality of web forms.

At least one aspect of the present disclosure is directed to a method of extracting and combining XML forms of an XFA document while preserving their inherent properties. The method can include identifying an XFA (extensible Markup Language (XML) Form Architecture) document. The method can include generating a plurality of XML files from the XFA document by parsing the XFA document using a parsing library. The method can include identifying, for each XML file of at least a subset of the plurality of XML files, a plurality of XML nodes within the XML file. Each XML node of the plurality of XML nodes may correspond to a particular node type in the XML file derived from a corresponding XFA node. The method can include generating, for the subset of the plurality of XML files, a corresponding plurality of web forms including a plurality of web nodes. Each web node may be mapped to a corresponding XML node and have a node type matching a node type of the corresponding XML node. The method can include receiving, responsive to providing the plurality of web forms via a user interface, for one or more web nodes of the plurality of web forms, input corresponding to the respective node type of the one or more web nodes. The method can include storing, in a data structure, for the one or more web nodes of the plurality of web nodes, an association between the input received for the web node and the node type and an identifier of an XML node to which the web node is mapped. Responsive to receiving a request to generate a populated XFA document, the method can include updating, the subset of the plurality of the XML files using, for each web node, the respective association between the input received for the web node and the corresponding identifier of the XML node of the subset of the plurality of XML files. The method can include generating, responsive to updating the subset of the plurality of XML files, the populated XFA document by combining the updated XML files according to the schema of the XFA document.

The method can include receiving the input by receiving i) a selection of a radio button, ii) a selection of a drop-down menu, iii) a textual input in a text field, and/or iv) a file (e.g., an identification of a file) submitted as an attachment. The method can include assigning, to at least one web node of the plurality of web nodes, an event initializer configured to initiate a process responsive to an interaction with the at least one web node. The process may further include modifying one or more second web nodes.

The method can include identifying the schema from the XFA document. The schema may indicate the locations of the XML files on the XFA document. At least one aspect of the present disclosure is directed to a non-transitory computer readable media having executable instructions. The instructions can be executed by one or more processors. The one or more processors may identify an XFA (extensible Markup Language (XML) Form Architecture) document. Upon identifying the XFA document, the one or more processors may generate a plurality of XML files from the XFA document by parsing the XFA document using a parsing library. The one or more processors may identify, for each XML file of at least a subset of the plurality of XML files, a plurality of XML nodes within the XML file. Each XML node of the plurality of XML nodes may correspond to a particular node type in the XML file derived from a corresponding XFA node. The one or more processors may generate, for the subset of the plurality of XML files, a corresponding plurality of web forms including a plurality of web nodes. Each web node may be mapped to a corresponding XML node and have a node type matching a node type of the corresponding XML node. The one or more processors may receive, responsive to providing the plurality of web forms via a user interface, for one or more web nodes of the plurality of web forms, input corresponding to the respective node type of the one or more web nodes. The one or more processors may store, in a data structure, for the one or more web nodes of the plurality of web nodes, an association between the input received for the web node and the node type and an identifier of an XML node to which the web node is mapped. In response to receiving a request to generate a populated XFA document, the one or more processors may update the subset of the plurality of the XML files using, for each web node, the respective association between the input received for the web node and the corresponding identifier of the XML node of the subset of the plurality of XML files. The one or more processors may generate, responsive to updating the subset of the plurality of XML files, the populated XFA document by combining the updated XML files according to the schema of the XFA document.

At least one aspect of the present disclosure is directed to a non-transitory computer readable media comprising executable instructions that, when executed by one or more processors, cause the one or more processors to identify an XFA (extensible Markup Language (XML) Form Architecture) document including a plurality of XML forms having a schema; extract the plurality of XML forms from the XFA document by parsing, using a parsing library, the XFA document and converting elements and attributes of the XFA document into corresponding XML elements and attributes; identify, for each XML form, a plurality of XML nodes within the XML form, each XML node of the plurality of XML nodes corresponding to a particular node type in the XML form; generate, for the plurality of XML forms, a corresponding plurality of web forms including a plurality of web nodes, each web node mapped to a corresponding XML node and having a node type matching a node type of the corresponding XML node; receive, responsive to providing the plurality of web forms via a user interface, for one or more web nodes of the plurality of web forms, input corresponding to the respective node type of the one or more web nodes; store, in a data structure, for each web node of the plurality of web nodes, an association between the input received for the web node and the node type and an identifier of the XML node to which the web node is mapped; responsive to receiving a request to generate a populated XFA document, update the plurality of the XML forms using, for each web node, the respective association between the input received for the web node and the corresponding identifier of the XML node of the plurality of XML forms; and generate, responsive to updating the plurality of XML forms, the populated XFA document by combining the updated XML forms according to the schema of the XFA form.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIGS. 3A and 3B illustrate XML files transformed into web forms presented at a user interface, in accordance with one or more implementations;

FIGS. 4A and 4B illustrate an XFA document populated from inputs at the web forms shown in FIGS. 3A and 3B, in accordance with one or more implementations.

DETAILED DESCRIPTION

Figure 1A:
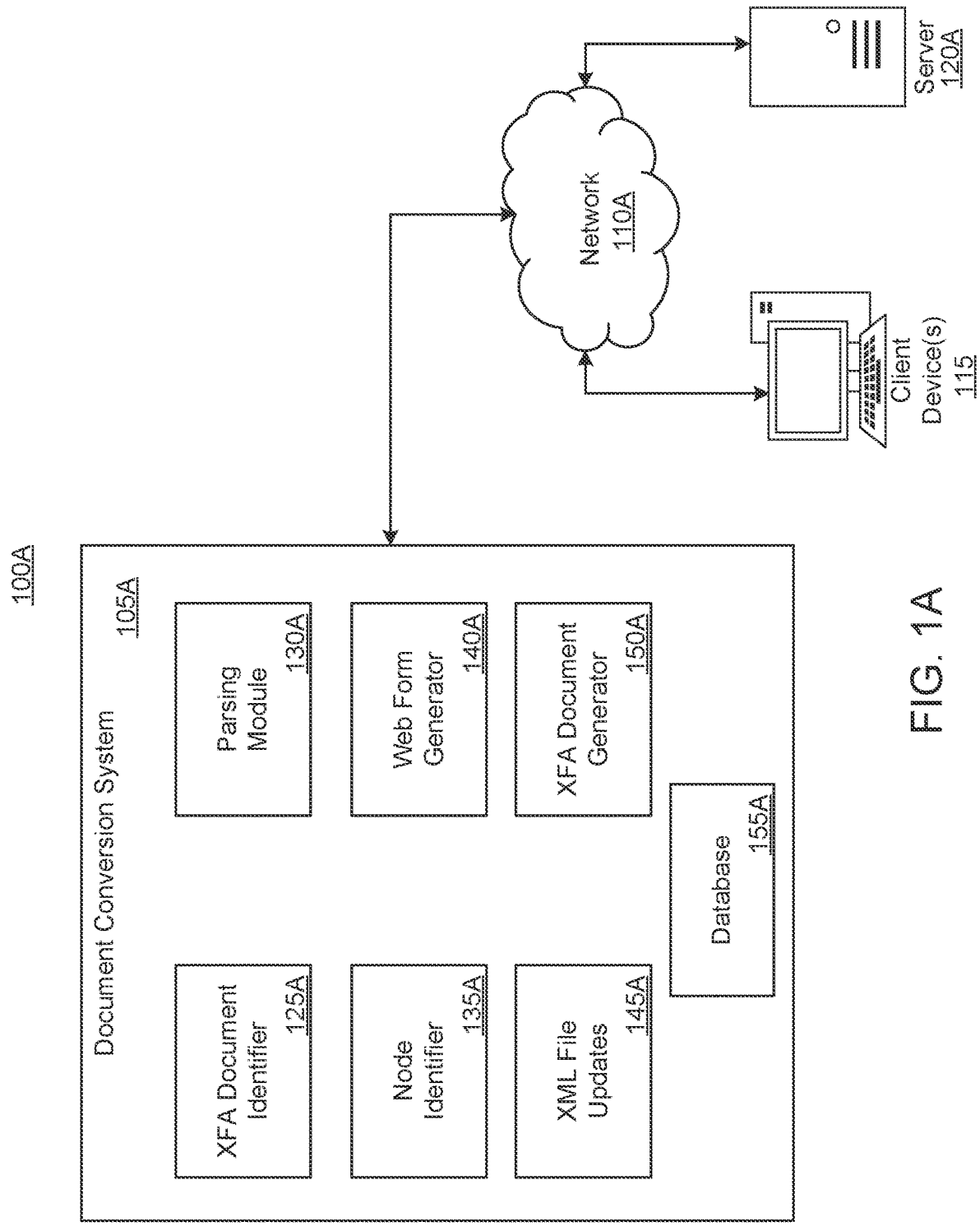
FIG. 1A illustrates a block diagram of an example system for extracting and combining XML forms of an XFA document, in accordance with one or more implementations.

Below are detailed descriptions of various concepts related to, and implementations of, techniques, approaches, methods, apparatuses, and systems for facilitating the extraction and combination of XML files of an XFA document while preserving the inherent properties of the original documents. The various concepts introduced above and discussed in greater detail below may be implemented in any of numerous ways, as the described concepts are not limited to any particular manner of implementation. Examples of specific implementations and applications are provided primarily for illustrative purposes. Furthermore, for purposes of reading the description of the various implementations below, the following descriptions of the sections of the specification and their respective contents may be helpful:

Section A describes implementations of systems for extracting and combining XML forms of an XFA document; and Section B describes a computing environment which may be useful for practicing implementations described herein.

A. Systems and Methods for Extracting and Combining XML Forms of an XFA Document Today, many people use XFA documents for things like filling out information online, creating documents, and other digital activities. In one example, different federal agencies may include XFA documents that may be accessed online through the agencies' websites. Despite being widely used, these forms have multiple technical problems that make them difficult to use. For instance, many XFA documents that are accessed online may include forms that different individuals are responsible for updating. However, XFA documents may not be accessible to those individuals at the same time or otherwise enable a collaborative environment in which individuals can separately access the XFA documents to update their respective portions. This can be a big drawback in group projects or collaborative settings, for example. Furthermore, the forms of XFA documents can be complex and difficult to work with because they are made of many smaller parts, known as "subforms," that can enable the conditional display of content based on user interactions and other criteria. This complexity can cause the forms to be slow to load and difficult to use.

A computing system implementing the systems and methods described herein can overcome the aforementioned technical deficiencies by converting XFA documents into web forms that users can access via applications (e.g., browsers) executing on the users' respective computing devices. The web forms can be more accessible to the users and can enable the users to review and populate the content and forms of the XFA document without accessing an application configured to display the XFA documents themselves.

For example, the computing system can parse an XFA document to generate different XML files from the XFA document. The XML files can be or correspond to forms of the XFA document and include the same or corresponding properties as the forms of the XFA document. The forms and properties of the forms of the XFA document can be XFA nodes of the XFA document. The computing system can generate identifiers for each of the XFA nodes. The computing system can store the identifiers in a data structure mapping the identifiers of the respective XFA nodes and node types of the XFA nodes with corresponding XML nodes in the XML files. The computing device can generate web nodes of web forms for the respective XML files that include the same node types (e.g., forms and/or properties) as the XML nodes of the XML files such that the web forms have the same node types as the forms of the XFA document. The computing system can assign identifiers for the nodes of the web forms to match the identifiers of the nodes of the XML files to which the web forms correspond, thereby mapping the web forms to the forms of the XFA document through the XML files. The computing system can generate a user interface that includes the different web forms and transmit the user interface to one or more client devices.

Users accessing the one or more client devices can execute an application (e.g., a browser) to view the web forms. The users can each populate (e.g., provide input into) one or more web forms on the user interface. The client devices can transmit the populated web forms back to the computing system. The computing system can use the identifiers of the nodes of the web forms to identify the XML nodes of the XML files to populate. The computing system can update the XML files with the populated values. The computing system can then convert the populated XML files back into an XFA document but populated with the inputs from the users. In this way, the computing system can operate as an abstraction layer between a system hosting the XFA document and client devices accessed by users that enables the users to perform create, read, update, and/or delete (CRUD) operations into nodes of web forms that have the same intrinsic properties as the forms and subforms of the XFA document itself.

To further preserve the properties of the XFA document during the conversion process, the computing system may determine a schema (e.g., an XFA schema) of the XFA document. The schema may indicate the locations and/or order of the different forms on the XFA document. For example, when generating the XML files of the XFA document, the computing system can identify the locations of the different forms from which XML files are being generated. The computing system can identify the locations based on coordinates of the forms in the code (e.g., the JavaScript, XML Markup, FormCalc, etc.) that is configured to generate the XFA document. The computing system can store the locations in the respective XML files generated from the XFA document and/or with the identifiers of the nodes of the respective forms. The computing system can also assign interactive events to the web forms that enable the user interface presenting the web forms to dynamically update similar to the XFA document. The computing system can use the determined locations when generating the web forms to cause the user interface including the web forms to appear the same as the XFA document. The computing device can then use the coordinates to recreate the XFA document populated with the inputs from the different computing devices to have the same schema as the unpopulated version of the XFA document.

The computing system can facilitate a collaborative population of the XFA document by providing selective permissions to different users to populate different web forms. The computing system can do so based on user roles, security levels, or other pre-defined criteria. For example, a user with administrative privileges may be allowed to access all web forms, while a user with limited privileges may only be allowed to access certain web forms. The computing system can lock and/or unlock different web forms when provisioning the user interface containing the web forms to the computing devices accessed by users of different roles. Users at the client devices may only be able to populate web forms that are unlocked for the respective users. In some embodiments, the computing system may only transmit web forms to users (e.g., through the computing devices accessed by the users) for which the users are authorized to view and/or populate. Thus, the computing system can avoid receiving duplicative, and potentially conflicting, values at the same web forms to facilitate the XFA document population process.

Referring to FIG. 1A, depicted is a block diagram of an example system 100A for extracting and combining XFA documents in a client-server configuration. In FIG. 1A, the system 100A can include at least one document conversion system 105A, at least one network 110, and one or more client devices 115A-115N (sometimes generally referred to as client device(s) 115). Each of the components (e.g., the document conversion system 105A, the network 110, the client devices 120, etc.) of the system 100A can be implemented using the hardware components or a combination of software with the hardware components of a computing system, such as the server 120A.

In FIG. 1A, the document conversion system 105A can include at least one XFA document identifier 125A, at least one parsing module 130A, at least one node identifier 135A, at least one web form generator 140A, at least one XML file updater 145A, and/or at least one XFA document generator 150A. The database 155A can include a parsing library, one or more web nodes, an association between the inputs received for the web nodes and the node type, an identifiers assigned to different XML nodes.

The document conversion system 105A can include at least one processor and a memory, e.g., a processing circuit. The memory can store processor-executable instructions that, when executed by a processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The document conversion system 105A can include one or more computing devices or servers that can perform various functions as described herein. The document conversion system 105A can include any or all of the components and perform any or all of the functions of the server 120A.

The network 110 can include computer networks such as the Internet, local, wide, metro or other area networks, intranets, satellite networks, other computer networks such as voice or data mobile phone communication networks, and combinations thereof. The document conversion system 105A of the system 100A can communicate via the network 110, for example with one or more client devices 115. The network 110 may be any form of computer network that can relay information between the document conversion system 105A, the one or more client devices 115, and one or more information sources, such as web servers or external databases, amongst others. In some implementations, the network 110 may include the Internet and/or other types of data networks, such as a local area network (LAN), a wide area network (WAN), a cellular network, a satellite network, or other types of data networks.

The network 110 may also include any number of computing devices (e.g., computers, servers, routers, network switches, etc.) that are configured to receive and/or transmit data within the network 110. The network 110 may further include any number of hardwired and/or wireless connections. Any or all of the computing devices described herein (e.g., the document conversion system 105A, the one or more client devices 115, the server 120A, etc.) may communicate wirelessly (e.g., via WiFi, cellular, radio, etc.) with a transceiver that is hardwired (e.g., via a fiber optic cable, a CAT5 cable, etc.) to other computing devices in the network 110. Any or all of the computing devices described herein (e.g., the document conversion system 105A, the one or more client devices 115, the server 120A, etc.) may also communicate wirelessly with the computing devices of the network 110 via a proxy device (e.g., a router, network switch, or gateway).

Each of the client devices 115 can include at least one processor and a memory, e.g., a processing circuit. The memory can store processor-executable instructions that, when executed by a processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 115 can include one or more computing devices or servers that can perform various functions as described herein. The one or more client devices 115 can include any or all of the components and perform any or all of the functions described herein.

Each client device 115 can include, but is not limited to, a mobile device (e.g., a smartphone, tablet, etc.), a television device (e.g., smart television, set-top box, et.), a personal computing device (e.g., a desktop, a laptop, etc.) or another type of computing device. Each client device 115 can be implemented using hardware or a combination of software and hardware. Each client device 115 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include a touchscreen displaying an application. The display can include a border region (e.g., side border, top border, bottom border).

In some implementations, the display can include a touchscreen display, which can receive interactions from a user. The interactions can result in interaction data, which can be stored and transmitted by the processing circuitry of the client device 115. The interaction data can include, for example, interaction coordinates, an interaction type (e.g., click, swipe, scroll, tap, etc.), and an indication of an actionable object with which the interaction occurred. Each client device 115 can include an input device that couples or communicates with the display of each client device to enable a player to interact with and/or select one or more actionable objects as described herein. The display can enable interaction with one or more visual indications provided through the display of each mobile device 115, and responsive to an interaction (e.g., select, click-on, touch, hover), the client device 115 can generate an indication identifying a player input.

The application can include a web application, a server application, a resource, a desktop, or a file. In some implementations, the application can include a local application (e.g., local to a client device 115), hosted application, Software as a Service (SaaS) application, virtual application, mobile application, and other forms of content. In some implementations, the application can include or correspond to applications provided by remote servers or third-party servers.

In some implementations, one or more client devices 115 can establish one or more communication sessions with the document conversion system 105A. The one or more communication sessions can each include a channel or connection between the document conversion system 105A and the one or more client devices 115. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic.

Each of the client devices 115 can be computing devices configured to communicate via the network 110 to access information resources, such as web pages via a web browser, or application resources via a native application executing on a client device 115. When accessing information resources, the client device can execute instructions (e.g., embedded in the native applications, in the information resources, etc.) that cause the client devices to display application interfaces.

The server 120A may be a specialized computer or software that provides resources such as files, data, or programs to other computers, operating within a client-server architecture. Servers are generally utilized to store data, facilitate applications, and offer services to clients. In the context of the present disclosure, the server 120A can function as a host for the XFA documents that are provided to the document conversion system 105A. The server 120A can be a physical server or a virtual server. For example, the server 120A can be hosted through various means, including, but not limited to, cloud-based systems or on-premises setups.

The document conversion system 105A is shown as including the database 155A. The database 155A can be a computer-readable memory that can store or maintain any of the information described herein, including but not limited to nodes, input types, node types, and/or identifiers intrinsic to XFA documents. The database 155A can also store other information that is relevant to the document conversion process, such as details about different platforms that web forms can be displayed on, or the different languages that the web forms can be translated into. In the database 155A, the nodes can represent the basic units of information in an XFA document. The nodes can be text strings, images, tables, or any other type of data. The nodes can be interacted with through various input means in the web forms, such as entering text, selecting options from a dropdown menu, or via drag-and-drop objects. Furthermore, node types can indicate the different types of nodes (or the kind of data stored), for example, related to the text fields, radio buttons, or dropdown menus. The database 155A can also store location information (e.g., coordinates on XFA documents) of the different forms on the XFA documents. To maintain an accessible database 155A, identifiers can be allocated or assigned to each node, facilitating the referencing of various nodes and enabling the conversion and CRUD operations described herein.

The document conversion system 105A is shown as including an XFA document identifier 125A. The XFA document identifier 125A, which may be a module, script, library, or function, can be used to retrieve XFA documents stored in the database 155A. For example, the XFA document identifier 125A can be used to assign a unique identifier to an XFA document. When a request is received to perform actions (such as viewing, editing, etc.) on an XFA document, the document conversion system 105A retrieves the XFA document from the database 155A based on the identifier included in the request. In some implementations, the XFA document identifier 125A can be used to identify an XFA document received by the document conversion system 105A. The XFA document identifier 125A can identify the document and generate an identifier for the XFA document. The XFA document identifier 125A can store the XFA document and the identifier in the database 155A for later retrieval, for example.

The document conversion system 105A can generate multiple XML forms from an XFA document. The document conversion system 150 can do so responsive to receiving a request update or populate an XFA document from a computing device (e.g., one of the client devices 115). The document conversion system 150 generate the XML forms by parsing the XFA document via a parsing module 130A, which may be a module, script, library, or function. In some implementations, the parsing module 130A can use a parsing library stored in the database 155A. The parsing library may include a set of rules for parsing XFA documents. For example, the parsing module 130A can parse the XFA document using an XML parsing programming wrapper that includes a set of functions for parsing XFA documents. In some implementations, the XML parsing programming wrapper can be used to identify the respective XML forms of an XFA document by identifying one or more "form" tags in code of the XFA document. Each form tag can include an "id" attribute that uniquely identifies the XML form. Once the wrapper has identified the XML forms in the XFA document, the wrapper can identify the different nodes of each XML form by identifying one or more "node" tags for the form in the code of the XFA document. Each node tag can also correspond to a unique identifier attribute. The wrapper can then use the identifier attribute of the node tag to identify each node. The wrapper can generate (e.g., using an incremental counter or a random number generator) and/or store an identifier for each node of the XML forms (including the XML forms themselves) in the database 155A with stored associations with identifiers of the XML forms. The nodes of an XML form together can correspond to or be an XML file. It is to be noted that XML files and XML forms are synonymous, as they both refer to the digital representation of forms in XML format.

In some implementations, the XML parsing programming wrapper can be used to extract more granular details from XFA documents, such as data patterns and structures. For example, the XML parsing programming wrapper can identify the coordinates or locations of the XML forms in the XFA document from the code of the XFA document. The locations or coordinates of the XML forms together can make up the schema of the XFA document. The wrapper can store the locations of the XML forms in the XML files for the XML forms to store a record of the schema of the XFA document.

In some implementations, the document conversion system 105A can use segmentation criteria to segment the XFA document into XML files. For example, the document conversion system 105A can use one or more rules or conditions to segment the XFA document into multiple XML files. The segmentation criteria can be or include defined specific sections, datasets, forms, xmpmeta, or other logical grouping in which to place data of an XFA document into XML files. The parsing module 130A can create a new XML file for each segment that the parsing module 130A identifies from the XFA document.

The document conversion system 105A can identify nodes within XML files generated from an XFA document to use to generate web forms that correspond with forms of the XFA document. For example, the document conversion system 105A can execute a node identifier 135A, which may be a module, script, library, or function, to identify the nodes of the XFA document. Each XML node can correspond to a particular node type in an XML file that is derived from a node of the XFA document. In some implementations, nodes can be elements, attributes, or data values of an XML form. For example, an XML node can be an element that represents a form field, such as a text field or a dropdown. An XML node can also be an attribute that specifies the properties of a form field, such as the field's name or its data type (e.g., a radio button, a drop-down menu, a field for receiving text inputs, etc.). An XML node can be a data value that is stored in a form field. In some implementations, the node identifier 135A can be an XML parsing wrapper module. The XML parsing wrapper module can use an XML parsing library stored in database 155A to navigate through the XML file and identify specific nodes based on their identifiers, as discussed herein.

After identifying the XML nodes, the document conversion system 105A can generate multiple web forms from the XML files via a web form generator 140A, which may be a module, script, library, or function. One or more web forms can include multiple web nodes. Each web node can be mapped to a corresponding XML node, and each web node can have a node type that matches the node type of the corresponding XML node. The web form generator 140A can store rules or mappings between XML format and the format of the web form for different types of nodes. These rules or mappings can be used to generate web forms, facilitating the transition from XML forms to web forms. For example, if an XML node is a text field, the corresponding web node can be a text input field. The web form generator 140A can set the properties of the text input field, such as the name, size, and/or label, and potentially include data validation rules to maintain data integrity. Similarly, if an XML node is a checkbox, the corresponding web node can be a checkbox input field. The web form generator 140A can set the properties of the checkbox input field, such as the name, label, and checked state, preserving the data structures of the original XML forms. In some implementations, the web form generator 140A can generate web forms in a variety of formats, such as HTML, JavaScript, or CSS.

When generating the web forms, the web form generator 140A can assign identifiers to the nodes of the web forms that match the identifiers of the nodes of the XML files from which the web forms were generated (and therefore the forms of the XFA document). The web form generator 140A can label the nodes with assigned identifiers in the properties or attributes of the respective nodes.

In some implementations, the document conversion system 105A can assign an event attribute (e.g., an event initializer) to each web node. An event attribute can correspond to a set of instructions or scripts that are designed to initiate a predetermined process responsive to interactions with the web forms. For example, in some implementations, the document conversion system 105A can add event attributes to different nodes of web forms. This step can be triggered or initialized when certain XFA document fields or forms include logic that initiates specific actions. To determine the events, the document conversion system 105A analyzes the attributes of the nodes extracted from the XFA document. The attributes of the nodes can be used to determine the events associated with the nodes. The document conversion system 105A then transfers these attributes to the corresponding XML nodes and then to the newly generated web forms to maintain the interactive functionalities derived from the original XFA document nodes in the web forms.

For instance, the document conversion system 105A can cause the user interface to dynamically update as users provide inputs into different web forms of the user interface. The document conversion system 105A can do so, for example, when an XFA document form has an attribute indicating that when a particular value is input or selected from the XFA document, the XFA document is updated to include one or more additional (e.g., defined) forms for population. The document conversion system 105 can identify such an attribute and include the attribute in the XML file for the XFA document form and then the web form from the XML file. The document conversion system 105 can store the additional forms in the message with the user interface such that if a user provides the input that causes the additional forms to appear, the user interface can automatically update to include the additional forms. For example, if a user selects an option indicating that the user is over 60 years old, the user interface can automatically or dynamically update to present one or more additional forms that correspond to the input of the user being over 60 years old. In some embodiments, the document conversion system 105A can receive the input and update the user interface to include the additional forms that correspond with the input.

In another example, an event attribute can be used to validate an input and modify other web nodes based on the input received. For example, a web form that allows users to enter their name, email address, and phone number could have several web nodes: a text field for the name, a text field for the email address, and/or a text field for the phone number. In some implementations, the event initializer for the name web node can be configured to initiate a process that validates the name input by using regular expressions to check if it is a valid name. Similarly, the event initializer for the email address web node can be configured to initiate a process that validates the email address input by using string functions to check if it is a valid email address. Further, the event initializer for the phone number web node can be configured to initiate a process that validates the phone number input by using database queries to check if it is a valid phone number. If the inputs are valid, the document conversion system 105A could then modify the web nodes, for example, by removing any error messages that were generated by the validation processes.

In another example, if an XFA document field or form has an attribute that specifies that the field should be validated for a valid email address, the document conversion system 105A can add the attribute to the XML file and web form that correspond with the XFA document field with any rules that can be used to validate the input. For instance, if the attribute is to validate that the input is a valid email address, the document conversion system 105 can include rules with the web form that indicate how the email is to be formatted (e.g., include an "@" symbol and other parameters for valid email addresses). Accordingly, when a user populates the email address field, the client device 115 presenting the user interface can automatically determine whether the input is valid by executing the code of the user interface. In some embodiments, the rules are stored by the document conversion system 105A and the document conversion system 150 uses the rules to validate the input. Responsive to receiving an input that does not conform with the rules, the client device 115 or the document conversion system 105A can update the user interface to indicate the invalid input.

The web forms generated by the document conversion system 105A can be added to a user interface. In some implementations, HTML code for a web form can be embedded into the user interface using, for example, a "form" tag, which can include several attributes to configure the form, such as the action, method, and/or enctype attributes. The action attribute can specify the URL that the form data will be submitted to. The method attribute can specify the HTTP method that may be used to submit the form data (e.g., how the form data is to be sent). The enctype attribute may specify the encoding that can be used for the form data (e.g., how the form data is to be encoded). The form tag can accommodate a variety of other HTML elements, such as text fields, checkboxes, and/or buttons, which can be used to collect the data inputs from the users. In some implementations, the web forms can be added to a user interface by embedding the requisite HTML code for the form directly onto the page. The HTML code can be sourced from different sources, such as a web form generator 140A or a library of pre-built forms in the database 155A. The web form generator 140 can include identifiers of the nodes from which the respective web forms were generated in the embedded HTML code.

Once the web forms are generated and integrated into the user interface, the document conversion system 105A can transmit the user interface to various client devices 115. For example, when a client device 115, such as a smartphone or a personal computer, makes a request to access the web page having the web forms, the document conversion system 105A can respond by sending the user interface including the forms (and any additional forms that may be used to dynamically update the user interface) too the client device 115's browser. These files may include HTML documents, stylesheets, scripts, and/or media files, which collaboratively present the web form in the user interface.

In some implementations, the document conversion system 105A can allow different client devices 115 to populate different web forms based on user permissions. This can be done by assigning attributes to the web forms that correspond with different permissions. For example, the web form generator 140A can read-only permissions to web forms that a user might be allowed to see but not be able to change any of the data. The web form generator 140A may assign edit permissions to web forms that users can view and update or populate (e.g., provide input). The web form generator 140A can assign such permissions based on the roles of the users' accounts or client devices that the document conversion system 105A may store in the database 155A. For the user with read-only permissions, the fields in the form may be locked to prevent the user from changing the data in those fields. For the user with edit permissions, the fields in the form presented via the user interface may be unlocked such that the user can change the data in those fields. In some implementations, certain fields may be locked while other fields may be unlocked depending on the user's permission levels. In some implementations, the web form generator can generate user interfaces such that only specific web forms are visible to different users or client devices 115. The different user interfaces can be stored on the document conversion system 105A and then sent to the client devices 115's browsers.

In some implementations, the document conversion system 105A can allow different client devices 115 to populate different web forms by creating different user interfaces for each type of client device 115. For example, the user interface for a smartphone might be different from the user interface for a personal computer. When a client device 115 makes a request to access the web page having the forms, the server 120A responds by sending the appropriate user interface to the client's browser. For example, if a user is using a smartphone, the user interface can be tailored to the smaller screen size and touch-screen controls of the smartphone. This means that the text and buttons on the user interface can be smaller and easier to tap on. The user interface may also be optimized to be more vertical to make it easier to scroll through on a smaller screen. Similarly, the user interface can be customized to the specific features of the client's device 115. For example, if a client device 115 has a built-in camera, the user interface may allow the user to take a picture to upload as part of the form. In some implementations, the user interface may have a button that allows the user to zoom in on the form, if the screen is too small to read all the text. This allows the document conversion system 105A to be used by different client devices 115 without having to modify the underlying data or logic.

Users at different client devices 115 can provide input to the user interface in several ways. For example, a user can use a keyboard to type text, a mouse to click on buttons, or a touchscreen to tap on icons. The specific input methods available may depend on the client device 115 and the user interface. In some implementations, user input may be restricted. For example, a web form may only allow users to enter certain characters, such as letters, numbers, and spaces. As described herein, the user interface can be tailored to restrict users from accessing certain features or functionality, depending on their permission level. For example, a user with certain permissions may only input data relating to clinical studies while another user who has a different set of permissions may be able to input data relating to clinical studies and fields relating to regulatory information. Additionally, the user interface can be designed to provide different levels of information to users based on their permission level. For example, a user with level one permissions can only see the basic information about a form, while a user with administration level permissions may be able to see all the information about the form, including sensitive data. The restrictions can be implemented in the code that generates the user interface, or the restrictions can be implemented in the browser itself.

The document conversion system 105A can receive user input from one or more client devices 115 in several ways, such as by receiving selection of a radio button, selection of an option from a drop-down menu, entering text in a text field, or submission of a file attachment. The document conversion system 105A can receive input corresponding to the respective node type of the web node(s), as provided via the user interface. For example, a user could select the "male" radio button to indicate their gender, select the "United States" option from a drop-down menu to indicate their country of residence, enter their name in a text field, or attach a copy of their resume when applying for a job. Any number of client devices can provide inputs into the web forms and transmit the updated web forms back to the document conversion system 105A.

In some implementations, the document conversion system 105A can store or update user data or user inputs (such as create, read, update, or delete operations) in the corresponding XML node via an XML file updater 145A, which may be a module, script, library, or function. For example, the XML file updater 145A can update a data structure in the database 155A that maps the input received for each web node to the XML node to which the web node is mapped with a matching identifier (e.g., the identifier generated for the node by the parsing module when generating the XML files). For each node (e.g., web node), the XML file updater 145A can identify the corresponding XML node and update the value for the XML node in the data structure or database storing the XML node. Examples of such updates are shown in the example data structure below:

| Web Node | Input | Node Type | Old Value | Updated Value | XML Node Identifier |
|---|---|---|---|---|---|
| Text Field | Name | Text | X | X' | 123 |
| Radio Button | Gender | Radio Button | Y | Y' | 456 |
| Dropdown Menu | Country Name | Dropdown Menu | Z | Z' | 789 |
| ... | ... | ... | ... | ... | ... |

In a non-limiting example, the document conversion system 105A can maintain correlation between XML files or forms and web forms using the identifiers extracted from the original XFA document or generated by the parsing module 130A. Each element in the XFA document can have one or more identifiers, which can be used to correlate the corresponding XML files and web forms. This can be achieved by using attributes such as "form", "subform", and/or the "field" unique/ID name of the XML files and web forms. In some implementations, the document conversion system 105A can determine which XML files to populate based on the inputs (or the correlation as described herein) into the web forms. For example, if the user enters data into a web form, the document conversion system 105A can use the identifiers to determine which XML files includes one or more identifiers matching the populated web form to populate with the input data. The document conversion system 105A can identify identifiers for the XML files that match the populated web forms. Responsive to determining one or more matches, the document conversion system 105A can update the XML files to include inputs of the matching web forms.

In some implementations, the document conversion system 105A generates a populated XFA document via an XFA document generator 150A, which may be a module, script, library, or function. The XFA document generator 150A can use a programming wrapper (or a specific tool) to combine XML files and generate an XFA document. The programming wrapper may take the XML files populated with values input or selected from the web forms as input and compile them into an XFA document such that the changes that have been applied to the XML files are reflected in the resulting XFA document. The programming wrapper can use the extracted location information from the original XFA document to generate an XFA document populated with the values that has the same schema as the original XFA document. The programming wrapper can store the populated XFA document in memory with an identifier of the XFA document.

In some implementations, the document conversion system 105A may transmit the populated XFA document to a remote computer. The document conversion system 105A can do so automatically after generating the populated XFA or responsive to receiving a request that includes an identifier matching the stored identifier of the XFA document. The document conversion system 105 can retrieve the populated XFA document and transmit the populated XFA document to a remote computer. In some cases, the document conversion system 105 can convert the populated XFA document into a flat file and transmit the flat file to the remote computer. Such may be advantageous, for example, to avoid tampering with the XFA document by a user of the remote computer.

Figure 1B:
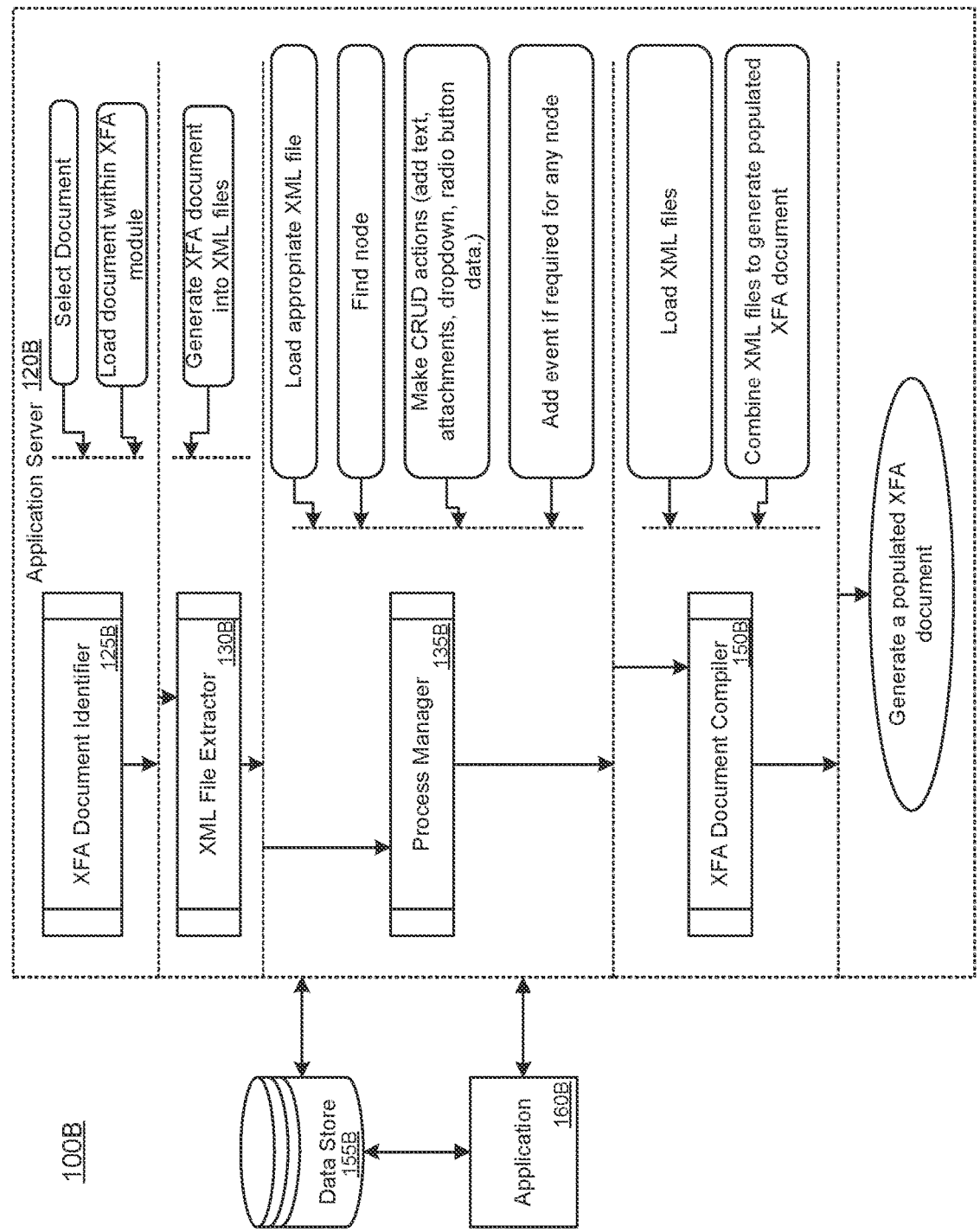
FIG. 1B illustrates a block diagram of an example system for extracting and combining XML forms of an XFA document, in accordance with one or more implementations.

Referring now to FIG. 1B, depicted is a block diagram of an example system 100B comprising at least one application server 120B (also generally referred to as a remote computing system 120B), at least one data store 155B, and an application 160B. Various components of the application server 120B shown in FIG. 1B may be similar to, and include any of the structure and functionality of, the document conversion system 105A of FIG. 1A. For example, the XFA document identifier 125B shown is similar in functionality to its counterpart XFA document identifier 125A (to retrieve XFA documents stored in the database 155A) shown in FIG. 1A. The XML file extractor 130B shown is similar in functionality to its counterpart parsing module 130A (to parse XFA documents) shown in FIG. 1A. Additionally, the process manager 135B shown is similar in functionality to its counterparts: node identifier 135A (to identify nodes), web form generator 140A (to generate web forms and web nodes), XML file updater 145A (to update user inputs), among others, shown in FIG. 1A. Further, the XFA document compiler 150B shown is similar in functionality to its counterpart XFA document generator 150A (to combine XML forms/files and generate a populated XFA document) shown in FIG. 1A.

The data store 155B, as shown, can be similar to the database 155A shown in FIG. 1A. The data store 155B can be a computer-readable memory that can store or maintain any of the information described herein, including but not limited to nodes, input types, node types, and/or identifiers intrinsic to XFA documents. The data store 155B can store event attributes of the XFA documents in the data store 155B. The data store 155B can store such information in XML files that the XML file extractor 130B extracts from the XFA documents. The data store 155B can also store other information that is relevant to the document conversion process, such as the schemas of the XFA documents and any event attributes of the respective details about different platforms that the web forms can be displayed on, or the different languages that the web forms can be translated into. The data store 155B can store identifiers of nodes of the XFA document in the XML files to enable conversion from an XFA document to XML files, from XML files to web forms, from populated web forms to populated XML files, and from populated XML files to a populated XFA document.

The application 160B, as shown, is a software program that runs on a client device 115. The application 160B can be an application programming interface (API) through which the application server 120B can communicate with different computers accessed by users to display user interfaces populated with web forms and to receive inputs into such web forms. Users can transmit inputs to the application 160B through browser applications executing on their client devices. The application 160B can transmit the inputs to the process manager to populate XML files of XFA documents.

As discussed above, the XFA document identifier 125B, which may be a module, script, library, or function, can be used to retrieve XFA documents stored in the data store 155B. In some implementations, the XFA document identifier 125B can assign a unique identifier to an XFA document. When a request is received to perform actions (such as viewing, editing, etc.) on an XFA document, the XFA document identifier 125B can retrieve or select the XFA document from the data store 155B based on the identifier included in the request. In some implementations, the XFA document identifier 125B can be used to load a document within a designated XFA module. For example, the XFA document identifier 125B can use the document's identifier to retrieve the document from the data store 155B and load it into the designated XFA module.

The XML file extractor 130B can parse an XFA document and generate one or more XML files for XML forms of the XFA document. In some implementations, the XML file extractor 130B can use a parsing library stored in the data store 155B. The parsing library may include a set of rules for parsing XFA documents. For example, the XML file extractor 130B can parse the XFA document using an XML parsing programming wrapper that includes a set of functions for parsing XFA documents to identify different forms and attributes of the forms (e.g., nodes) of the XFA document. In some implementations, the XML file extractor 130B can extract more granular details from the XFA document, such as the locations or coordinates of the respective forms of the XFA document and, when applicable, event attributes of the forms. The XML file extractor 130 can store such details in the XML files that correspond to the details. The XML file extractor can generate an identifier or identification for each node (e.g., form or attribute of a form) and store the identifiers in the respective XML files.

Once the XML files have been extracted or generated, the XML files can be loaded into the process manager 135B. As discussed above, the process manager 135B, which may be a module, script, library, or function, can identify nodes corresponding to a particular node type in the XML file. After identifying the XML nodes, the process manager 135B can generate one or more web forms with one or more web nodes from the XML files. Each web node can be mapped to a corresponding XML node. Each web node can have a node type that matches the node type of the corresponding XML node (e.g., a field of an XML file can be a field in the corresponding web node). The process manager 135B can store rules or mappings between XML formats and the formats of the web form for different types of nodes. These rules or mappings can be used to generate web forms, facilitating the transition from XML forms to web forms. In some implementations, the process manager 135B can add attributes to the web forms for events when the corresponding forms in the XFA documents have attributes for events. Examples of such events can include dynamically updating the user interface with new web forms or validating user inputs to ensure the web forms conform to one or more rules or conditions (e.g., have a specific format).

The process manager 135B can add the web forms generated by the application server 120B to a user interface, in some cases at locations within the user interface that match the locations of the corresponding forms in the XFA document. Once the web forms are generated and integrated into the user interface, the application server 120B can transmit the user interface to various client devices. The application server 120B can transmit the user interface to the client devices via the web application 160B, which the application server 120B can host. The client devices can communicate with the application 160B via a browser application and display the user interface with the different web forms corresponding to the forms of the XFA document.

The application server 120B can receive user input from different client devices in several ways, such as by receiving selections of radio buttons, selections of options from a drop-down menu, entering text in a text field, or submitting a file attachment. Users may provide such inputs to populate different web forms. The process manager 135B can identify the nodes of the web forms that correspond to the inputs by identifying the identifiers of the nodes. The process manager 135 can identify XML files that have matching identifiers to the identifiers of the identified nodes and populate or perform any other CRUD operation on the identified XML files with the corresponding inputs. The application server 120B can update the XML files with inputs from any number of client devices based on matching identifiers of the nodes in the XML files to the nodes of the web forms.

The XFA document compiler 150B, which may be a module, script, library, or function, can take the XML files as input and compile them into an XFA document so that all the changes that have been applied to the XML files are reflected in the resulting XFA document. The compiled XFA document can be in the same schema as was determined from the initial unpopulated XFA document. In some implementations, the XFA document compiler 150B can analyze attributes indicating the positions of the individual XML forms within the XFA document (e.g., the schema of the XFA document). The XFA document compiler 150B can use the positions of the XML forms and nodes and node types in the XML forms to generate an XFA document with the same configuration or schema as the original XFA document but populated with the values input into the web forms.

Figure 2:
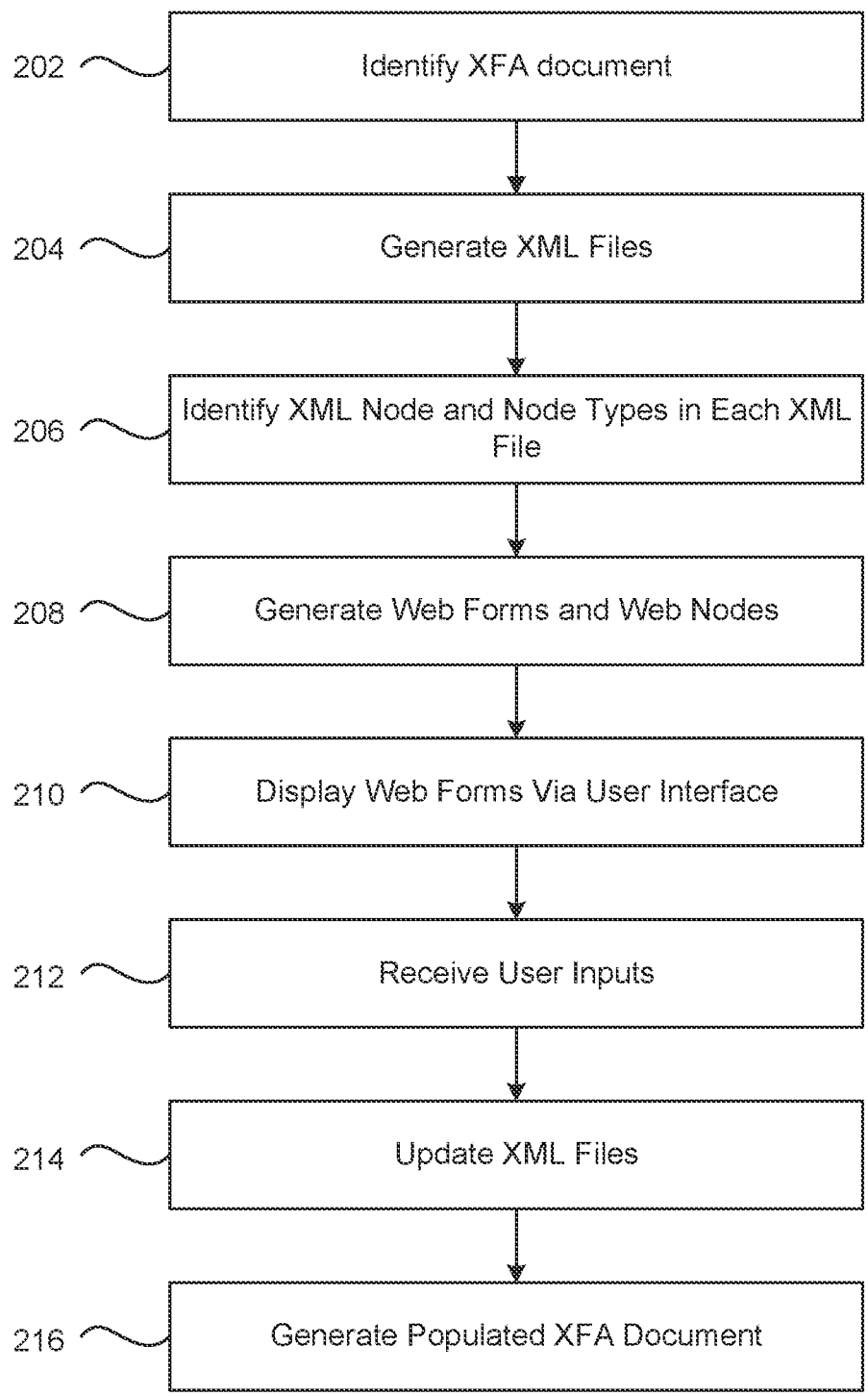
FIG. 2 illustrates an example flow diagram of a method for extracting and combining XML forms of an XFA document, in accordance with one or more implementations.

Referring now to FIG. 2, depicted is an illustrative flow diagram of a method 200 for extracting and combining XML files of an XFA document. The method 200 can be executed, performed, or otherwise carried out by a document conversion system 105A or an application server 120B. The document conversion system 105A or the application server 120B can be remote to one or more client devices and communicate with the one or more client devices via a computer network 110. In a brief overview of the method 200, the document conversion system 105A or the application server 120B can identify an XFA document (STEP 202), generate XML files from the XFA document (STEP 204), identify XML nodes and node types in each XML file (STEP 206), generate web forms and web nodes (STEP 208), display web forms via a user interface (210), receive user inputs (212), update XML files (214), and generate a populated XFA document (216).

In further detail of method 200, the document conversion system can include an XFA document identifier to identify an XFA document (STEP 202). The XFA document identifier, which may be a module, script, library, or function, can be used to ingest, receive, and/or retrieve XFA documents. For example, the document conversion system can receive an XFA document from a remote computing device. The XFA document identifier can identify the XFA document and store the XFA document in a database, in some cases with an identifier (e.g., a document identifier) that the XFA document identifier extracts from the XFA document or generates for the XFA document. In another example, the XFA document identifier can retrieve a stored XFA document from memory (e.g., from a database). The XFA document can retrieve the stored XFA document responsive to receiving a request that includes an identification that matches an identification of the XFA document in memory. Such a request can be a request to perform one or more actions (such as viewing, editing, etc.) on the XFA document, the document conversion system retrieves the XFA document from the database based on the identifier included in the request.

The document conversion system can generate one or more XML forms from the XFA document by parsing the XFA document via a parsing module, which may be a module, script, library, or function (STEP 204). In some implementations, the parsing module can use or include a parsing library stored in a database. The parsing library may include a set of rules for parsing XFA documents. For example, the parsing module can parse the XFA document (e.g., the underlying code of the XFA document) using an XML parsing programming wrapper that includes a set of functions for parsing XFA documents. In some implementations, the XML parsing programming wrapper can be used to identify the respective XML forms of an XFA document by identifying one or more "form" tags in the code underlying the XFA document. Each form tag can include an "id" attribute that uniquely identifies the XML form to which the XML tag corresponds. The wrapper can identify the different nodes (e.g., attributes) of each XML form by identifying "node" tags of nodes of the XML form and/or identification attributes of the nodes. Each node tag can also correspond to a specific id attribute. The wrapper can store the identifiers for each node of the XML forms in a database or data structure configured to store data for the XFA document. The wrapper can also identify the node types of the specific nodes (e.g., a form, an element of the form, an attribute, or a data value). The wrapper can identify the node types from the attributes of the respective nodes. The wrapper can include the node types of the different nodes in the XML files that the wrapper generates for the respective XML forms.

In some implementations, the XML parsing programming wrapper can be used to extract more granular details from the XFA document, such as data patterns and structures of the XFA document. The XML parsing programming wrapper can interpret the underlying code of the XFA document to understand the hierarchical relationships and the organization of nodes in the XFA forms. For example, the parsing module can identify the coordinates of different forms of the XFA document from the script from which the XFA document is generated or displayed. Together, the coordinates can be or be a part of the schema for the XFA document.

In some implementations, the parsing module can identify events of the forms of the XFA document. Events can be attributes of a form that may cause the computer displaying the form to perform an action, such as updating the XFA document or validating that an input provided into the form complies with one or more rules. The parsing module can identify the attributes of individual forms and determine whether the forms include any event attributes. The parsing module can include event attributes of the XFA forms in the XML files that the parsing module generates for the XFA forms.

The document conversion system can identify one or more specific nodes within an XML file via a node identifier, which may be a module, script, library, or function (STEP 206). Each XML node in an XML file can correspond to a particular node type in the XML file that corresponds to a corresponding node type of a form in the XFA document. The XML parsing wrapper module can use an XML parsing library stored in a database to navigate through the different XML files and identify the nodes and node types of the XML files. The XML parsing wrapper module can identify specific nodes based on the identifiers of the nodes, in some implementations.

The document conversion system can generate one or more web forms from the XML files via a web form generator, which may be a module, script, library, or function (STEP 208). The web form generator can generate the web forms based on the identified nodes in the XML files. The one or more web forms can include one or more specific web nodes that correspond to the web forms themselves or attributes of the web forms. The web form generator can map each web node to a corresponding XML node such that each web node can have a node type that matches the node type of the corresponding XML node and have metadata (e.g., location data or an event attribute) that matches the XML node. In one example, an XML file can include a node for a field with an event attribute indicating to dynamically update the user interface responsive to receiving an input (e.g., a defined input) into the field as well as coordinates for the field. The web form generator can generate a web form for the XML file such that the web form appears on the user interface at the same or a corresponding location to the form on the XFA document and updates the user interface upon receiving an input similar to how the form would operate on the XFA document. The web form generator can similarly generate web forms that correspond to the forms in the XFA document such that the user interface including the web forms looks and/or dynamically operates the same or similar to the XFA document itself. The web form generator can generate web forms in a variety of formats, such as HTML, JavaScript, or CSS to enable the web forms to appear on a browser application.

The web forms generated by the web form generator can be added to a user interface. The web form generator can be added at the locations specified for the web forms (e.g., the locations that correspond with the coordinates of the corresponding forms in the XFA document) in the data of the web forms. Accordingly, the web form generator can generate the user interface to appear the same as the XFA document itself by causing the coordinates of the web forms to match the coordinates of the corresponding forms in the XFA document.

Once the web forms are generated and integrated into the user interface, the document conversion system can transmit the user interface to various client devices (STEP 210). The document conversion system can transmit the user interface to the client devices automatically after generating the user interface or in response to receiving a request for the user interface. In some cases, the document conversion system can transmit the user interface through a communication session that the document conversion system had previously established with the client devices.

In some implementations, the document conversion system can allow different client devices to populate different web forms. The document conversion system can assign locking or unlocking attributes to the different web forms of the user interface. The locking attribute can restrict the web forms from being populated or provided with input. The unlocking attribute can cause web forms with the attribute to not be restricted from receiving input. In some implementations, only the locking attribute is used to restrict users from providing input to specific forms. The document conversion system can lock web forms according to the client device or account that receives the user interface. For example, different individuals may have different roles. The roles may correspond to specific forms that the individuals can update. The document conversion system can store a record of which roles are assigned to which account or client device that is receiving the user interface. The document conversion system can determine the roles of the roles of the accounts or client devices receiving the user interface and lock and/or unlock the web forms of the user interface according to the roles. In some cases, the document conversion system can generate different user interfaces for each account and client device to only include the web forms that the role of the account or client device can populate. The document conversion system can transmit the user interface to the client devices with the attributes (e.g., locking or unlocking attributes) or configurations that the document conversion system determined for the specific client devices or accounts through which the client devices are receiving the user interface.

The document conversion system can receive user inputs from one or more (e.g., multiple) client devices (STEP 212). The document conversion system can receive the inputs as inputs into the different web forms of the user interface. For example, users can provide inputs into the user interface by selecting a radio button, selecting an option from a drop-down menu, entering text in a text field, submitting a file attachment, etc. The document conversion system can receive the inputs as the users provide their inputs into the user interface or responsive to the users selecting a "submit" button that causes that the inputs to be transmitted to the document conversion system. The document conversion system can receive the inputs with data indicating the nodes or web forms that correspond to the inputs. For example, the document can receive an input of a value into a field indicating the node of the field. The document conversion system can receive the inputs into the different web forms of the user interface from the client devices to which the document conversion system transmitted the user interface.

The document conversion system can store or update user data or user inputs (such as create, read, update, or delete operations) in the corresponding nodes of the XML files via an XML file updater, which may be a module, script, library, or function (STEP 214). For example, the XML file updater can update a data structure in the database that maps the input received for each web node to the node type and the identifier of the XML node to which the web node is mapped. For each node (e.g., web node in this example), the XML file updater can identify a node type, such as text field, radio button, dropdown menu, or any other type of node. In some implementations, the document conversion system can maintain correlation between multiple XML files (or forms, as described herein) and web forms using the identifiers extracted from the original XFA document. For example, the XML file updater can identify the nodes of the XML files to populate with values based on the identifiers of the nodes of the XML files matching the nodes of the populated web forms.

The document conversion system generates a populated XFA document via an XFA document generator, which may be a module, script, library, or function (STEP 216). The XFA document generator can use a programming wrapper (or a specific tool) to combine XML files to generate a populated XFA document. The programming wrapper may take the XML files as input and compile them into an XFA document so that all the changes that have been applied to the XML files (e.g., values populated into the web forms that are transferred into the XML files) are seamlessly reflected in the resulting XFA document. The compiled XFA document can cause the XFA document to have the same schema as was determined from the initial unpopulated XFA document using the coordinates or other location information of the XML nodes. Accordingly, the document conversion system can cause the XFA document to appear the same or similar to the original XFA document but with populated forms.

Figure 3A:
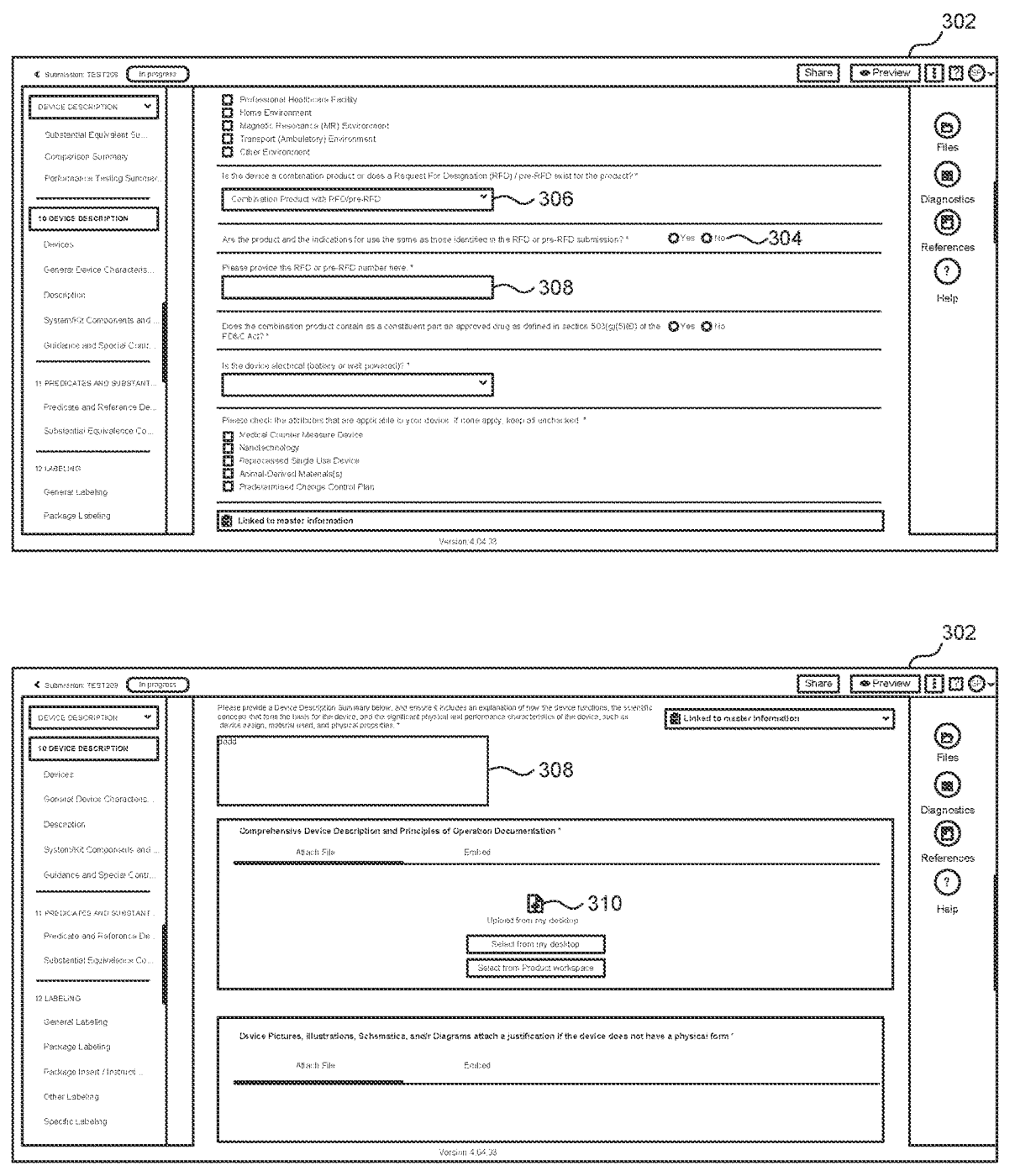
Figure 3B:
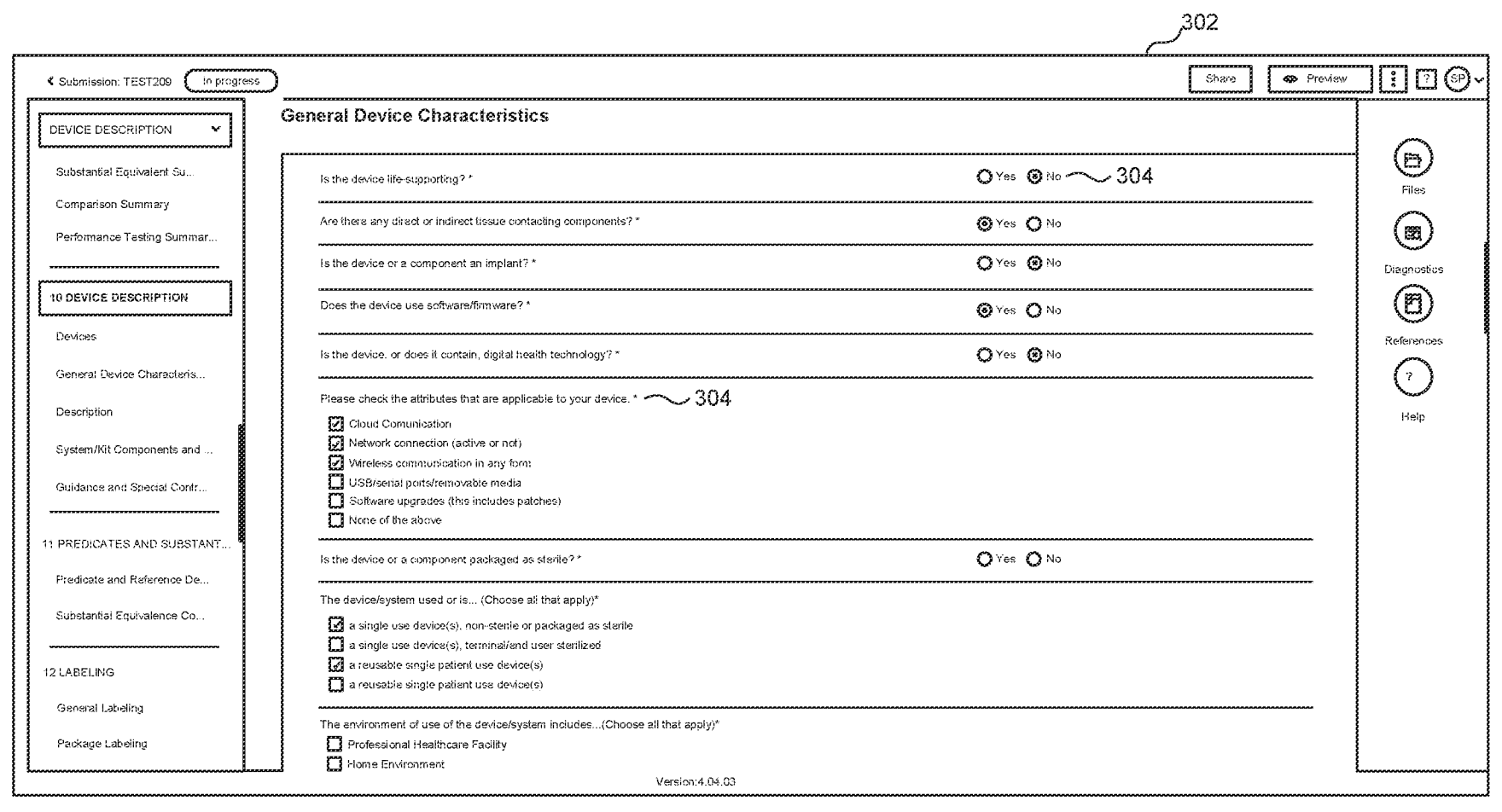

Referring now to FIGS. 3A and 3B, depicted are the XML files transformed into web forms and presented via a user interface 302. As shown, the user interface 302 displays various forms, such as radio buttons 304, drop-down menus 306, text fields 308, and/or file attachments 310. The forms are shown to be populated with inputs provided at the user interface 302. As described herein, a radio button 304 allows a user to select one option from a group of options (e.g., answering "yes" or "no" to a question). A drop-down menu 306 allows a user to select one option from a list of options (e.g., selecting "Combination Product with RFD/pre-RFD"). The text field 308 can allow a user to enter text (not shown in this example). Identification of a file to be submitted as an attachment allows a user to attach a file to the form. Each of these inputs can be represented by a node in the XML file, and the data for various inputs can be added to the corresponding node in the XML file. For example, the data for the radio button 304 can be added to the node that represents the radio button 304. Similarly, the data for the drop-down menu 306 can be added to the node that represents the drop-down menu 306.

The user interface 302 can be transmitted to multiple client devices. Doing so can enable multiple users to view and provide inputs into the web forms of the user interface 302. Thus, the user interface 302 can enable collaboration (e.g., concurrent collaboration) between different users, which may not be possible on the original XFA document from which the web forms were generated.

Referring now to FIGS. 4A and 4B, depicted is an XFA document 402 populated from inputs at the web forms. FIGS. 4A and 4B show a populated XFA document 402 displaying updated inputs provided by one or more of the client devices 115. For example, the updated radio button 404 is displayed as "Yes" (e.g., in FIG. 4A) and the updated drop-down menu input is displayed as "Combined Product with RFD/pre-RFD" (e.g., in FIG. 4B) on the populated XFA document 402. Further, as shown, unpopulated spaces are either left blank or marked with a question mark.

As described herein, when users input data into web forms, the document conversion system 105A uses identifiers to identify the corresponding XML files that should be populated with the data. This can be done by matching the identifiers from the populated web forms to those in the XML files. The document conversion system 105A can integrate changes made to the XML files into an XFA document, adhering to the schema determined from the initial unpopulated XFA document. This can be visualized in FIGS. 4A and 4B, which display varying inputs from different client devices 115. These inputs are mapped to the corresponding nodes in the XML files.

For example, to maintain a systematic correlation between the XML files of an XFA document and web forms generated from the XML files, the document conversion system 105A can use metadata to store relationships between the XML files and the forms of the XFA document. This metadata can be included in each XML file and web form and can be used to identify the XML files that need to be populated with data when the user enters data into a web form. For example, the metadata could include the name of the XML file, the identifier of the node in the XML file that should be populated with data or that describes an attribute of the XML file, and/or the type of data that should be populated in the node.

B. Computing Environment

Having discussed specific embodiments of the present solution, it may be helpful to describe aspects of the operating environment as well as associated system components (e.g., hardware elements) in connection with the methods and systems described herein.

Figure 5A:
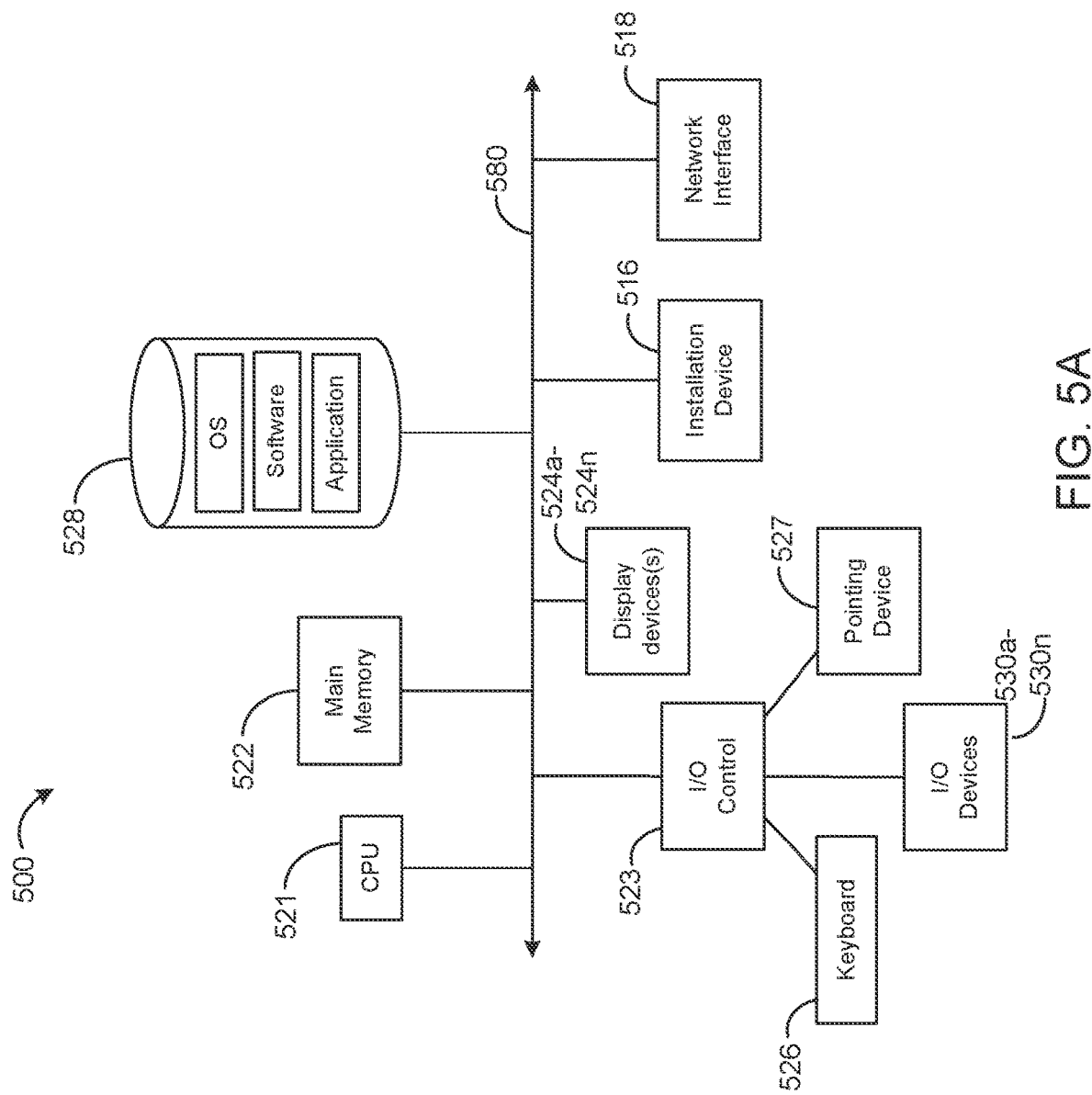
FIGS. 5A and 5B illustrate block diagrams depicting illustrations of computing devices useful in connection with the methods and systems described herein.
Figure 5B:
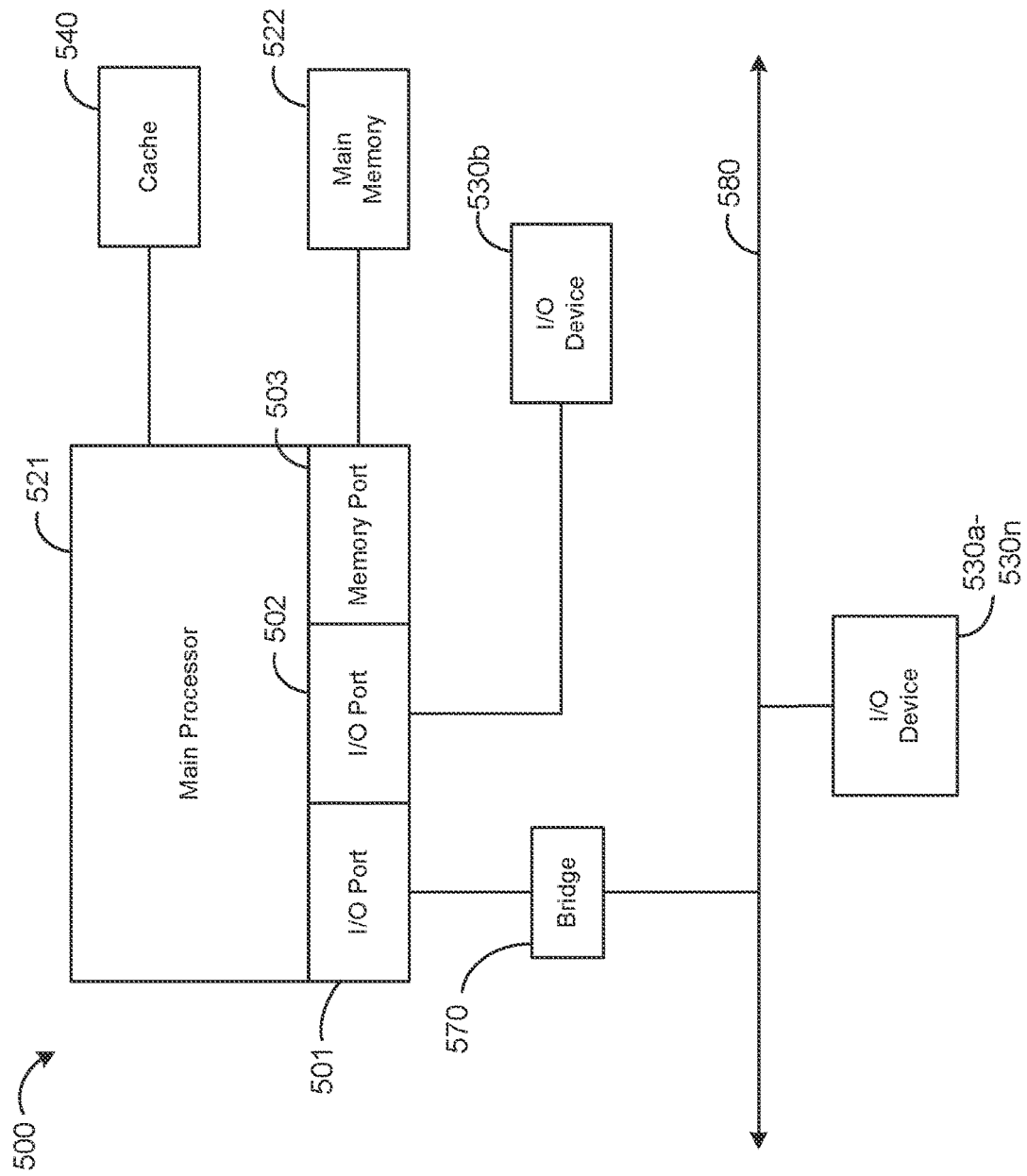

The systems discussed herein may be deployed as and/or executed on any type and form of computing device, such as a computer, network device or appliance capable of communicating on any type and form of network and performing the operations described herein. FIGS. 5A and 5B depict block diagrams of a computing device 500 useful for practicing an embodiment of the systems and methods described herein. As shown in FIGS. 5A and 5B, each computing device 500 includes a central processing unit 521, and a main memory unit 522. As shown in FIG. 5A, a computing device 500 may include a storage device 528, an installation device 516, a network interface 518, an I/O controller 523, display devices 524a-524n, a keyboard 526 and a pointing device 527, such as a mouse. The storage device 528 may include, without limitation, an operating system and/or software. As shown in FIG. 5B, each computing device 500 may also include additional optional elements, such as a memory port 503, a bridge 570, one or more input/output devices 530a-530n (generally referred to using reference numeral 530), and a cache memory 540 in communication with the central processing unit 521.

The central processing unit 521 is any logic circuitry that responds to and processes instructions fetched from the main memory unit 522. In many embodiments, the central processing unit 521 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 500 may be based on any of these processors, or any other processor capable of operating as described herein.

Main memory unit 522 may be one or more memory chips capable of storing data and allowing any storage location to be directly accessed by the microprocessor 521, such as any type or variant of Static random access memory (SRAM), Dynamic random access memory (DRAM), Ferroelectric RAM (FRAM), NAND Flash, NOR Flash and Solid State Drives (SSD). The main memory 522 may be based on any of the above described memory chips, or any other available memory chips capable of operating as described herein. In the embodiment shown in FIG. 5A, the processor 521 communicates with main memory 522 via a system bus 580 (described in more detail below). FIG. 5B depicts an embodiment of a computing device 500 in which the processor communicates directly with main memory 522 via a memory port 503. For example, in FIG. 5B the main memory 522 may be DRDRAM.

FIG. 5B depicts an embodiment in which the main processor 521 communicates directly with cache memory 540 via a secondary bus, sometimes referred to as a backside bus. In other embodiments, the main processor 521 communicates with cache memory 540 using the system bus 580. Cache memory 540 typically has a faster response time than main memory 522 and is provided by, for example, SRAM, BSRAM, or EDRAM. In the embodiment shown in FIG. 5B, the processor 521 communicates with various I/O devices 530 via a local system bus 580. Various buses may be used to connect the central processing unit 521 to any of the I/O devices 530, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 524, the processor 521 may use an Advanced Graphics Port (AGP) to communicate with the display 524. FIG. 5B depicts an embodiment of a computer 500 in which the main processor 521 may communicate directly with I/O device 530b, for example via HYPERTRANSPORT, RAPIDIO, or INFINIBAND communications technology. FIG. 5B also depicts an embodiment in which local busses and direct communication are mixed: the processor 521 communicates with I/O device 530a using a local interconnect bus while communicating with I/O device 530b directly.

A wide variety of I/O devices 530a-530n may be present in the computing device 500. Input devices include keyboards, mice, trackpads, trackballs, microphones, dials, touch pads, touchscreens, and drawing tablets. Output devices include video displays, speakers, inkjet printers, laser printers, projectors and dye-sublimation printers. The I/O devices may be controlled by an I/O controller 523 as shown in FIG. 5A. The I/O controller may control one or more I/O devices such as a keyboard 526 and a pointing device 527, e.g., a mouse or optical pen. Furthermore, an I/O device may also provide storage and/or an installation device 516 for the computing device 500. In still other embodiments, the computing device 500 may provide USB connections (not shown) to receive handheld USB storage devices such as the USB Flash Drive line of devices manufactured by Twintech Industry, Inc., of Los Alamitos, California.

Referring again to FIG. 5A, the computing device 500 may support any suitable installation device 516, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 500 may further include a storage device, such as one or more hard disk drives or redundant arrays of independent disks, for storing an operating system and other related software, and for storing application software programs such as any program or software 520 for implementing (e.g., configured and/or designed for) the systems and methods described herein. Optionally, any of the installation devices 516 could also be used as the storage device. Additionally, the operating system and the software can be run from a bootable medium.

Furthermore, the computing device 500 may include a network interface 518 to interface to the network 203 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 500 communicates with other computing devices 500' via any type and/or form of gateway or tunneling protocol such as Secure Socket Layer (SSL) or Transport Layer Security (TLS). The network interface 518 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

In some implementations, the computing device 500 may include or be connected to one or more display devices 524a-524n. As such, any of the I/O devices 530a-530n and/or the I/O controller 523 may include any type and/or form of suitable hardware, software, or combination of hardware and software to support, enable or provide for the connection and use of the display device(s) 524a-524n by the computing device 500. For example, the computing device 500 may include any type and/or form of video adapter, video card, driver, and/or library to interface, communicate, connect or otherwise use the display device(s) 524a-524n. In one embodiment, a video adapter may include multiple connectors to interface to the display device(s) 524a-524n. In other embodiments, the computing device 500 may include multiple video adapters, with each video adapter connected to the display device(s) 524a-524n. In some implementations, any portion of the operating system of the computing device 500 may be configured for using multiple displays 524a-524n. One ordinarily skilled in the art will recognize and appreciate the various ways and embodiments that a computing device 500 may be configured to have one or more display devices 524a-524n.

In further embodiments, an I/O device 530 may be a bridge between the system bus 580 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 500 of the sort depicted in FIGS. 5A and 5B may operate under the control of an operating system, which control scheduling of tasks and access to system resources. The computing device 500 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 500 can be any workstation, telephone, desktop computer, laptop or notebook computer, server, handheld computer, mobile telephone or other portable telecommunications device, media playing device, mobile computing device, or any other type and/or form of computing, telecommunications or media device that is capable of communication. The computer system 500 has sufficient processor power and memory capacity to perform the operations described herein.

In some implementations, the computing device 500 may have different processors, operating systems, and input devices consistent with the device. For example, in one embodiment, the computing device 500 is a smart phone, mobile device, tablet or personal digital assistant. In still other embodiments, the computing device 500 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 500 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system comprising:
one or more processors configured by machine-readable instructions to:
identify a markup language document;
generate a plurality of markup language files from the markup language document by parsing the document;
identify, for each markup language file of at least a subset of the plurality of markup language files, a plurality of markup language nodes within the markup language file, each markup language node of the plurality of markup language nodes corresponding to a particular node type in the markup language file that is derived from a corresponding markup language node;
generate, for the subset of the plurality of markup language files, a corresponding plurality of web forms including a plurality of web nodes, each web node mapped to a corresponding markup language node and having a node type matching a node type of the corresponding markup language node;
receive, responsive to providing the plurality of web forms via a user interface, for one or more web nodes of the plurality of web forms, input corresponding to the respective node type of the one or more web nodes;
store, in a data structure, for the one or more web nodes of the plurality of web nodes, an association between the input received for the web node and the node type and an identifier of a markup language node to which the web node is mapped;
responsive to receiving a request to generate a populated markup language document, update the subset of the plurality of the markup language files using, for each web node, the respective association between the input received for the web node and the corresponding identifier of the markup language node of the subset of the plurality of markup language files; and
generate, responsive to updating the subset of the plurality of markup language files, the populated markup language document by combining the updated markup language files according to the schema of the markup language document.

2. The system of claim 1, wherein the node type comprises one of a form, an element of the form, an attribute, or a data value of a markup language node.

3. The system of claim 1, wherein the one or more processors are configured to receive the input by receiving a i) selection of a radio button, ii) selection of a drop-down menu, iii) textual input in a text field, or an iv) identification of a file to be submitted as an attachment.

4. The system of claim 1, wherein the one or more processors are configured to assign, to at least one web node of the plurality of web nodes, an event initializer configured to initiate a process responsive to an interaction with the at least one web node, wherein the process includes modifying one or more second web nodes.

5. The system of claim 1, wherein the one or more processors are configured to identify the schema from the markup language document, the schema indicating locations of the markup language files on the markup language document.

6. The system of claim 1, wherein the plurality of web forms is a plurality of HTML forms.

7. The system of claim 1, wherein the one or more processors are configured to:
store the populated markup language document in memory with a markup language document identifier;
receive, from a computing device, a request comprising the markup language document identifier; and
responsive to the request, retrieve the markup language document based on the markup language document identifier and transmit the markup language document to the computing device.

8. The system of claim 1, wherein to generate a plurality of markup language files from the markup language document, the one or more processors are configured to:
segment the markup language document into a plurality of markup language segments according to a set of criteria; and
generate a respective markup language file for each of the plurality of markup language segments.

9. The system of claim 1, wherein the one or more processors are further configured to:
convert the markup language document into a flat file format; and
transmit the markup language document in the flat file to a computing device.

10. The system of claim 1, wherein the one or more processors are configured to:
generate the user interface to include the plurality of web forms; and
transmit the user interface to a plurality of computing devices.

11. The system of claim 10, wherein the one or more processors are configured to:
receive the input from the plurality of computing devices at one or more of the plurality of web forms.

12. The system of claim 11, wherein the input comprises a plurality of values or selections, and wherein the one or more processors are configured to:
receive a respective portion of the input from each of the plurality of computing devices.

13. The system of claim 11, wherein the one or more processors are configured to provide access to a different set of the plurality of web forms to each of the plurality of computing devices.

14. The system of claim 11, wherein the one or more processors are configured to restrict at least one of the plurality of computing devices from providing an input to a defined set of the plurality of web forms.

15. A method comprising:
identifying, by one or more processors, a markup language document;
generating, by the one or more processors, a plurality of markup language files from the markup language document by parsing the markup language document;
identifying, by the one or more processors, for each markup language file of at least a subset of the plurality of markup language files, a plurality of markup language nodes within the markup language file, each markup language node of the plurality of markup language nodes corresponding to a particular node type in the markup language file that is derived from a corresponding markup language node;

generating, by the one or more processors, for the subset of the plurality of markup language files, a corresponding plurality of web forms including a plurality of web nodes, each web node mapped to a corresponding markup language node and having a node type matching a node type of the corresponding markup language node;

receiving, by the one or more processors, responsive to providing the plurality of web forms via a user interface, for one or more web nodes of the plurality of web forms, input corresponding to the respective node type of the one or more web nodes;

storing, by the one or more processors, in a data structure, for the one or more web nodes of the plurality of web nodes, an association between the input received for the web node and the node type and an identifier of a markup language node to which the web node is mapped;

responsive to receiving a request to generate a populated markup language document, updating, by the one or more processors, the subset of the plurality of the markup language files using, for each web node, the respective association between the input received for the web node and the corresponding identifier of the markup language node of the subset of the plurality of markup language files; and generating, by the one or more processors, responsive to updating the subset of the plurality of markup language files, the populated markup language document by combining the updated markup language files according to the schema of the markup language document.

16. The method of claim 15, wherein the node type comprises one of a form, an element of the form, an attribute, or a data value of a markup language node.

17. The method of claim 15, further comprising receiving the input by receiving a i) selection of a radio button, ii) selection of a drop-down menu, iii) textual input in a text field, or an iv) identification of a file to be submitted as an attachment.

18. The method of claim 15, further comprising assigning, to at least one web node of the plurality of web nodes, an event initializer configured to initiate a process responsive to an interaction with the at least one web node, wherein the process includes modifying one or more second web nodes.

19. The method of claim 15, further comprising identifying the schema from the markup language document, the schema indicating locations of the markup language files on the markup language document.

20. A non-transitory computer readable media comprising executable instructions that, when executed by one or more processors, cause the one or more processors to:

identify a markup language document including a plurality of markup language forms having a schema;

extract the plurality of markup language forms from the markup language document by parsing the markup language document and converting elements and attributes of the markup language document into corresponding markup language elements and attributes;

identify, for each markup language form, a plurality of markup language nodes within the markup language form, each markup language node of the plurality of markup language nodes corresponding to a particular node type in the markup language form;

generate, for the plurality of markup language forms, a corresponding plurality of web forms including a plurality of web nodes, each web node mapped to a corresponding markup language node and having a node type matching a node type of the corresponding markup language node;

receive, responsive to providing the plurality of web forms via a user interface, for one or more web nodes of the plurality of web forms, input corresponding to the respective node type of the one or more web nodes;

store, in a data structure, for each web node of the plurality of web nodes, an association between the input received for the web node and the node type and an identifier of the markup language node to which the web node is mapped;

responsive to receiving a request to generate a populated markup language document, update the plurality of the markup language forms using, for each web node, the respective association between the input received for the web node and the corresponding identifier of the markup language node of the plurality of markup language forms; and generate, responsive to updating the plurality of markup language forms, the populated markup language document by combining the updated markup language forms according to the schema of the markup language form.

* * * * *